United States Patent [19]

Lucas et al.

[11] Patent Number: 4,560,667
[45] Date of Patent: Dec. 24, 1985

[54] HALOGEN GLASSES MODIFIED WITH CARBON DISULPHIDE AND PROCESS OF PREPARATION

[75] Inventors: Jacques Lucas, Betton; Gilles Fonteneau, Chateaugiron, both of France

[73] Assignee: Centre National de la Recherche Scientifique, Paris, France

[21] Appl. No.: 632,902

[22] Filed: Jul. 20, 1984

[30] Foreign Application Priority Data

Jul. 25, 1983 [FR] France .................................. 83 12258

[51] Int. Cl.$^4$ ........................ C03C 3/12; C03C 21/00
[52] U.S. Cl. ........................................ 501/40; 501/30; 65/30.1; 65/2
[58] Field of Search ........................ 501/40, 41, 43, 44; 65/30.1, 134, 2, 3.12

[56] References Cited

U.S. PATENT DOCUMENTS

| 2,466,507 | 4/1949 | Sun | 106/47 |
| 2,511,224 | 6/1950 | Sun | 106/47 |
| 4,141,741 | 2/1979 | Lucas et al. | 501/40 |
| 4,328,318 | 5/1982 | Miranday et al. | 501/40 |
| 4,341,873 | 6/1982 | Robinson et al. | 501/40 |

FOREIGN PATENT DOCUMENTS

| 919006 | 2/1947 | France | 2/12 |
| 2354977 | 1/1978 | France . | |
| 2384724 | 10/1978 | France . | |
| 2488873 | 2/1982 | France . | |

OTHER PUBLICATIONS

Baldwin and Mackenzie, *Journal of the American Ceramic Society*, Sep.-Oct. 1979, pp. 537-538.

Primary Examiner—Helen M. McCarthy
Assistant Examiner—Karl Group
Attorney, Agent, or Firm—Brisebois & Kruger

[57] ABSTRACT

Halogen glass is treated, while heated above its fusion temperature, with carbon disulphide. The resulting halogen glass is essentially free of parasitic absorption bands in the infra-red spectrum. The treatment with carbon disulphide apparently lowers the hydroxyl ion content and the metal-oxygen bonds sufficiently to avoid the infra-red absorption bands.

12 Claims, 1 Drawing Figure

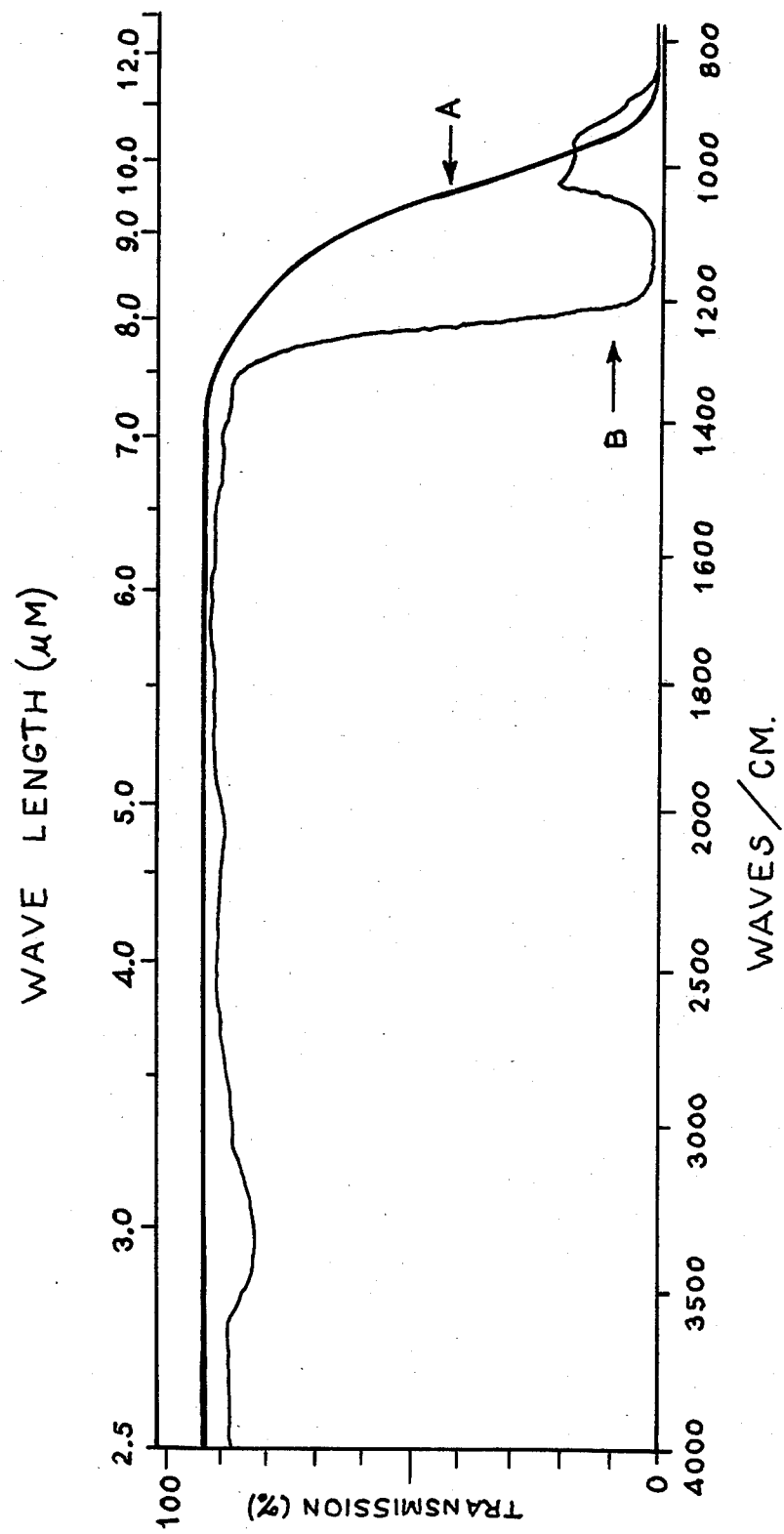

HALOGEN GLASSES MODIFIED WITH CARBON DISULPHIDE AND PROCESS OF PREPARATION

The object of the present invention is halogen glasses modified with carbon disulphide, and a process for preparation of such glasses.

BACKGROUND OF THE INVENTION

It is known that the search for new glasses, particularly having a very large optical window extending to the infra-red spectrum, has led many researchers to prepare glasses which are constituted primarily of metal halides and which for a new class of the glasses, known as hologen glasses.

These halogen glasses are, during their production, contaminated, especially by $OH^-$ or $O_{2-}$ ions. The presence of these impurities in the halogen glasses causes the appearance of troublesome parasitic absorption bands in the vicinity of a wave length 2.9 micrometers, due to the $OH^-$ hydroxyl, and in the vicinity of 7-9 micrometers, due to the metal-oxygen bonds, see for example, M. ROBINSON et al., Mat. Res. Bull., Vol. 15, No. 6, pp 735-742 (1980). These parasitic absorptions alter the optical characteristics of the halogen glasses, and the object of the present invention is to eliminate these disadvantages.

SUMMARY OF THE INVENTION

It has been discovered in accordance with this invention, that the treatment of halogen glasses with carbon disulphide has a spectacular effect on the disappearance of the $OH^-$ and $O^{2-}$ ions, which leads in turn to the disappearance of the parasitic absorption bands in the infra-red region mentioned above.

Analysis of the infra-red transmission spectrum actually shows the complete absence of absorption in the 2.9 micrometers region which is very sensitive to very small amounts of $OH^-$ ions, even on the order of several ppm.

In the neighboring 8 micrometer region, disappearance of the parasitic absorptions which were present before treatment is also noted.

The mechanism of the action of the carbon disulphide is not clearly known: it is thought that the $OH^-$ and $O^{2-}$ ions may be replaced by $S^{2-}$ ions which do not absorb infra-red radiation.

Thus the present invention has as an object improved halogen glasses, with a metallic halide base, characterized by the fact that they are modified with carbon disulphide, so that the content of hydroxyl ions and metal-oxygen bonds is small enough that the so modified glasses have practically no parasitic absorption bands due to the said ions and bonds, particularly in the vicinity of wave lengths 2.9 micrometers and 7-9 micrometers.

The treatment with carbon disulphide according to the invention is applicable in general, to all glasses with a metal halide base.

These halogen glasses are in particular, glasses with a base of a mixture of metal halides (fluoride, chloride, bromide, iodide), and especially halogen glasses having at least one (and usually two) halides of a metal of atomic weight greater than 23.

Known halogen glasses have at least one, and most often, at least two halides of a metal chosen from among magnesium, aluminum, the 3d transition metals (Sc, Ti, V, Cr, Mn, Fe, Co, Ni, Cu, Zn), the metals Ga, Y, Zr, Nb, Ag, Cd, In, and in particular a halide of a metal having an atomic weight greater than 138, such as La (and the Ce, Pr, Nd, Pm, Sm, Eu, Gd, Tb, Dy, Ho, Er, Tm, Yb, and Lu lanthanides), Hf, Hg, Tl, Pb, Bi, Th and U.

In addition to the halides of the metals cited above, these halogen glasses may contain, for example, alkali halides or alkaline earths.

Among the halogen glasses which can be modified with carbon disulphide, according to the invention, there may in particular be cited those which are described in French patents and patent applications 919,006, which corresponds to U.S. Pat. Nos. 2,511,224; 2,354,977 and 2,384,724, which correspond to U.S. Pat. No. 4,141,741; 80.18139; and 82.02698, and in published European patent applications No. 0017566 and 0036373. See also the reviews of BALDWIN and MACKENZIE in *Journal of the American Ceramic Society*, September–October 1979, pp 537–538, and in *Journal of Non-Crystalline Solids*, p 309 (1981), under the title "Halide Glasses".

The invention also has as its object a process for preparing improved halogen glasses by treating or modifying the glasses with carbon disulphide.

This process is essentially characterized by the fact that a mixture of the constituents of the desired glass is subjected to the action of carbon disulphide while the mixture is maintained above its fusion temperature.

Of course, this is carried out in a controlled atmosphere or environment which will not introduce $OH^-$ or $O^{2-}$ ions into the treated mixture.

This is done at a sufficiently high temperature above the fusion temperature so that the mixture to be treated is sufficiently fluid to favor the action of $CS_2$ vapor. For example, a temperature of up to 200° C. above the fusion point may be used, or in particular 50°–200° C. above the fusion temperature.

The composition thus treated is then cooled to obtain the $CS_2$ modified glass, which can be molded to the desired shape.

Preferably, the process of the invention includes subjecting the starting mixture to the action of a gaseous current containing carbon disulphide. The carbon disulphide is preferably diluted in an inert carrier gas such as, for example, nitrogen or a rare or rarified gas.

The carbon disulphide is allowed to act over a long enough period of time so that the resulting glass shows no more parasitic absorption in the indicated regions of the spectrum. This time may vary from a few minutes to a few hours especially as a function of the quantity of the glass mixture which is treated.

The following is presented as a non-limiting example of the invention.

EXAMPLE 1

A sample mixture of glass having the following composition is placed in a crucible of vitreous carbon:
15% $BaF_2$, 28.33% $ThF_4$, 28.33% $YbF_3$, 28.33% $ZnF_2$ The crucible is introduced into a silica tube furnished at its upper end with a gas input tube, and a gas outlet opening. After a 5 minute purging under nitrogen azote, the assembly is placed in a furnace at 840° C., and subjected to a slow nitrogen or helium sweep.

The reactive atmosphere is obtained by bubbling helium through the liquid carbon disulphide and passing this gas containing the $CS_2$ vapors through the silica tube for 30 minutes.

The attached drawing shows the evolution of the infra-red transmission of the glass sample before and after treatment. It will be seen that the parasitic absorption bands of curve B of the untreated glass have disappeared in curve A of the glass treated with $CS_2$, according to the invention.

Similar results were obtained by treatment of glasses having the following compositions:

EXAMPLE 2

13% $BaF_2$-32% $ThF_4$-24% $YF_3$-31% $ZnF_2$

EXAMPLE 3

15% $BaF_2$-24% $ThF_4$-24% $YF_3$-24% $ZnF_2$-13% $InF_3$

EXAMPLE 4

33.75% $BaF_2$-8.75% $ThF_4$-57.5% $ZrF_4$

We claim:

1. Improved halogen glass essentially free of parasitic absorption bands in the infra-red range comprising $CS_2$ modified halogen glass containing at least one halide of a metal of an atomic weight greater than 23, the glass having been heated to a temperature above its fusion temperature and subjected to the action of carbon disulfide gas in a controlled atmosphere to reduce the hydroxyl ion content and the metal-oxygen bonds sufficiently to essentially eliminate parasitic absorption bands in the infra-red range.

2. Improved halogen glass according to claim 1 wherein, the glass contains at least one halide of a metal of an atomic weight greater than 138.

3. Improved halogen glass according to claim 1 wherein said at least one halide is a fluoride.

4. A method of preparing an improved halogen glass essentially free of parasitic absorption bands in the infra-red region comprising, subjecting a halogen glass, heated to a temperature above its fusion temperature, to the action of carbon disulphide gas, in a controlled atmosphere.

5. A method according to claim 4 comprising, first heating a mixture of components of halogen glass to a temperature above the fusion temperature to form the halogen glass, and treating the fused glass with the carbon disulphide.

6. A method according to claim 4 wherein, the glass is at a temperature up to 200° C. above its fusion temperature while it is subjected to the action of the carbon disulphide.

7. A method according to claim 6 wherein, the temperature is 50° to 200° C. above the fusion temperature of the glass.

8. A method according to claim 4 wherein, the carbon disulphide gas is mixed with helium.

9. A method according to claim 4 wherein, the carbon disulphide gas is mixed with nitrogen.

10. A method according to claim 4 wherein, the carbon disulphide gas is mixed with an inert gas.

11. The method of claim 4 wherein the halogen glass contains at least one halide of a metal of an atomic weight greater than 23.

12. A method according to claim 11 wherein said at least one halide is a fluoride.

* * * * *